US00RE39786E

(19) United States
(12) Reissued Patent
Dellach

(10) Patent Number: US RE39,786 E
(45) Date of Reissued Patent: Aug. 21, 2007

(54) CLAMP WITH IMPROVED INTERNAL CAM ACTION

(75) Inventor: Jeffrey J. Dellach, Macomb, MI (US)

(73) Assignee: Norgren Automotive, Inc., Mt. Clemens, MI (US)

(21) Appl. No.: 10/154,368

(22) Filed: May 23, 2002

Related U.S. Patent Documents

Reissue of:
(64) Patent No.: 6,079,896
Issued: Jun. 27, 2000
Appl. No.: 09/003,927
Filed: Jan. 7, 1998

(51) Int. Cl.
*F16B 2/18* (2006.01)

(52) U.S. Cl. ..... 403/322.3; 403/31; 269/32
(58) Field of Classification Search ..... 403/322.3, 403/31, 322.1, 321, 24; 269/32, 34, 27, 77
See application file for complete search history.

(56) References Cited

U.S. PATENT DOCUMENTS

| | | | | |
|---|---|---|---|---|
| 3,482,830 | A | * 12/1969 | Sendoykas | 269/32 |
| 3,570,835 | A | * 3/1971 | McPherson | 269/32 |
| 3,599,957 | A | 8/1971 | Blatt | |
| 3,698,757 | A | 10/1972 | Smith | |
| 3,724,837 | A | * 4/1973 | McPherson | 269/32 |
| 3,807,719 | A | * 4/1974 | Williamson | 269/34 |
| 3,817,510 | A | * 6/1974 | Jatcko | |
| 4,368,913 | A | 1/1983 | Brockmann et al. | |
| 4,475,607 | A | 10/1984 | Haney | |
| 4,494,739 | A | 1/1985 | Valentine | |
| 4,529,182 | A | * 7/1985 | Valentine | |
| 4,793,602 | A | * 12/1988 | McPherson | |
| 5,040,836 | A | 8/1991 | Roudaut | |
| 5,064,177 | A | * 11/1991 | Witt et al. | |
| 5,085,480 | A | 2/1992 | Jackson | |
| 5,118,248 | A | * 6/1992 | Brucher | 403/322.3 X |
| 5,152,568 | A | * 10/1992 | Blatt | |
| 5,193,789 | A | 3/1993 | Tucker | |
| 5,215,295 | A | 6/1993 | Hoover | |
| 5,253,910 | A | 10/1993 | Perrier | |
| 5,284,375 | A | 2/1994 | Land, III | |

(Continued)

FOREIGN PATENT DOCUMENTS

| | | | |
|---|---|---|---|
| DE | 3528337 | A1 | 2/1987 |
| EP | 0576946 | A1 | 1/1994 |
| GB | 1 456 703 | | 11/1976 |
| GB | 2041263 | A | 9/1980 |
| RU | 1187981 | * | of 0000 |

*Primary Examiner*—Rehana Perveen
*Assistant Examiner*—Anand B. Patel
(74) *Attorney, Agent, or Firm*—Young Basile

(57) ABSTRACT

A clamping apparatus, for use with an actuator, has a housing with a guide track mounted on or formed in the housing. A roller or cam operably engages with the guide track such that the cam can be moved and positioned along the guide track by way of the actuator. At least one pivoting arm is pivotally mounted on the housing adjacent to and spaced from the guide track. Each pivoting arm has an elongate slot adjacent to the shoulder. The elongate slot has two arcuate surfaces positioned parallel to each other and has two end surfaces joining the arcuate surfaces to define a closed loop surface. The cam is positioned within the elongate slot of each pivoting arm to pivot each pivoting arm between a clamped position and a released position as the cam is moved along the guide track and driven against the arcuate surfaces of each pivoting arm. The clamping apparatus can include stop members for limiting the movement of the cam and/or the range of motion for each pivoting arm, a swivel mount and/or a mounting bracket enabling the clamping apparatus to be positioned in any desired angular orientation, a lost-motion link incorporated in the internal cam action of the clamping apparatus, and/or side plates for preventing the infiltration of foreign matter in the internal cam action.

31 Claims, 6 Drawing Sheets

U.S. PATENT DOCUMENTS 5,383,697 A 1/1995 Roudaut
5,460,358 A * 10/1995 Sendoykas ..... 269/32
5,503,378 A * 4/1996 Schauss et al.
5,516,173 A 5/1996 Sawdon
5,693,113 A 12/1997 Dries et al.
5,816,567 A * 10/1998 Horn ..... 269/32
5,904,358 A 5/1999 Hosono et al.
5,941,513 A 8/1999 Moilanen et al.
5,967,502 A * 10/1999 Dykstra ..... 269/32
5,975,605 A * 11/1999 Kot ..... 269/32 X
6,115,898 A 9/2000 Sawdon

* cited by examiner

CLAMP WITH IMPROVED INTERNAL CAM ACTION

Matter enclosed in heavy brackets [ ] appears in the original patent but forms no part of this reissue specification; matter printed in italics indicates the additions made by reissue.

FIELD OF THE INVENTION

The present invention relates to a clamping apparatus used in conjunction with a conventional actuator, the clamping apparatus having an improved cam-action for pivoting and positioning one or more clamp arms of the clamping apparatus.

BACKGROUND OF THE INVENTION

Prior known power clamps or grippers typically include a pneumatic or hydraulic differential pressure motor with a cylinder housing fixedly mounted to a support structure. At the forward or rod end of the cylinder housing, a clamp arm or gripper jaw mounting structure is connected to the cylinder housing to support movement of at least one clamp arm or gripper jaw connected to the piston rod of the motor. The jaw or clamp arm is pivoted to an open position in response to reciprocal movement of the piston rod in one direction, and is driven to a closed work piece gripping position in response to reciprocal movement of the piston rod in the opposite direction. Typical configurations of known power clamps can be seen in U.S. Pat. Nos. 5,152,568 and 3,599,957. U.S. Pat. No. 5,152,568 discloses a gripper jaw driven through a linkage assembly, while U.S. Pat. No. 3,599,957 discloses a clamp arm driven through cam rollers connected to a rod and moveable in angular slots in the arm to pivot the arm.

It is also known to provide a mounting bracket rotatably mounted on the support with a pair of pivotally mounted plates each having a clamping arm and a cam track. The mounting bracket is known to include an annular shoulder engaging the support, where a flange draws the shoulder against the support to thereby selectively lock the bracket and the piston and cylinder against rotation in any of a plurality of rotational positions.

SUMMARY OF THE INVENTION

The present invention relates to a clamping apparatus having a conventional fluid operated cylinder actuator. A mounting bracket is positionable in any one of a variety of positions with respect to a longitudinal axis of the actuator and clamp. According to the present invention, the clamping apparatus includes an internal cam action for the clamp arm. The fluid cylinder actuator drives the roller or cam follower reciprocally between first and second positions in order to move the clamp arm from the clamped position to the released position. As the roller or cam follower reciprocates, it drives the clamp arm by following an arcuate cam surface or slot formed in each clamp arm. It is desirable in the present invention to also provide the capability of a swivel mounting of the clamp arm or gripper jaw to the cylinder housing to allow the clamp to be positioned in any desired angular orientation with respect to a longitudinal axis of the fluid cylinder actuator by rotation with respect to a circular collar extending through a mounting bracket. The clamp can be held in any desired angular orientation with respect to the cylinder housing by tightening a locking mechanism, such as set screws. The present invention can also provide an adjustable stop to define the angular orientation of the open clamp position. The stop member, such as a threaded screw, can be positioned to engage an outer end of the cylinder rod as the roller or cam follower is driven toward the released position. By threading the adjustable stop further into a threaded aperture, a maximum angle of opening for the clamp arm can be limited to a position less than a full released angular orientation, which generally corresponds to approximately 90° from the clamped position. The internal cam action according to the present invention provides a cam surface or slot and cam follower in a completely enclosed housing to prevent the infiltration of foreign matter into the cam mechanism. Rubber seals can also be provided if desired extending along the periphery of the housing to further obstruct the infiltration of foreign matter through areas where the clamp arm extends through and rotates with respect to the housing. By removing one side plate, the corresponding clamp arm can be changed in the field without disassembling the entire clamp. Different standard configurations of clamp fingers or gripper jaws can be attached to the outer ends of the clamp arm thereby permitting easy changing of the jaw style. Sensors can also be provided for signaling the position of the cam follower or roller to indicate the open position and/or the closed clamp position.

The present invention relates to a clamping apparatus for use with a conventional actuator, such as a fluid-operated cylinder. The clamping apparatus has a support structure defining an internal guide track on the support structure. A slide block is engageable with the guide track such that the slide block can be moved and positioned along the guide track by way of the actuator. At least one pivoting arm is provided. Each pivoting arm is pivotally mounted on the support structure adjacent to the guide track. Each pivoting arm has an elongate slot adjacent to one longitudinal end. The elongate slot has two arcuate surfaces positioned parallel to each other and two end surfaces which join the arcuate surfaces and thereby define the slot as a closed loop surface. The slide block supports a cam or roller positioned within the elongate slot of each pivoting arm to thereby pivot each pivoting arm between a clamped position and a released position as the slide block and roller combination is moved along the guide track and the roller or cam is simultaneously driven against the arcuate surface and moved in the elongate slot of each pivoting arm. The present invention further can provide selectively positionable stop members or screws for limiting the movement of the roller and/or the range of motion for each pivoting arm, a swivel mount and/or a mounting bracket which together enable the clamping apparatus to be positioned in any desired angular orientation. A lost-motion link can be incorporated into the internal cam action of the apparatus if desired, and side plates for preventing the infiltration of foreign matter in the internal cam action can also be provided.

Other objects, advantages and applications of the present invention will become apparent to those skilled in the art when the following description of the best mode contemplated for practicing the invention is read in conjunction with the accompanying drawings.

BRIEF DESCRIPTION OF THE DRAWINGS

The description herein makes reference to the accompanying drawings wherein like reference numerals refer to like parts throughout the several views, and wherein.

DESCRIPTION OF THE PREFERRED EMBODIMENT

Figure 1:
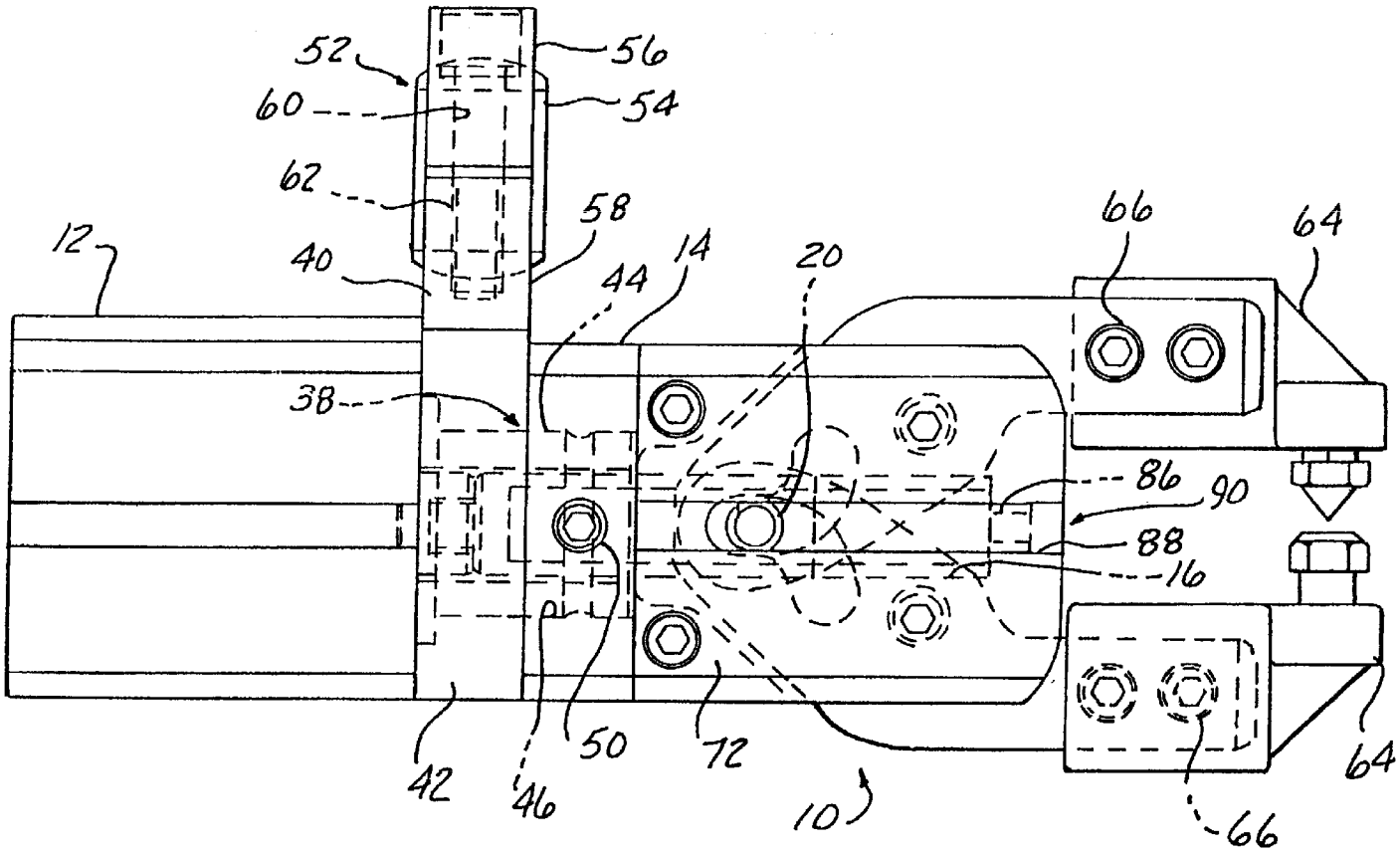
FIG. 1 is a side view of a clamping apparatus in a clamped position with internal cam-action clamp arms according to the present invention.
Figure 2:
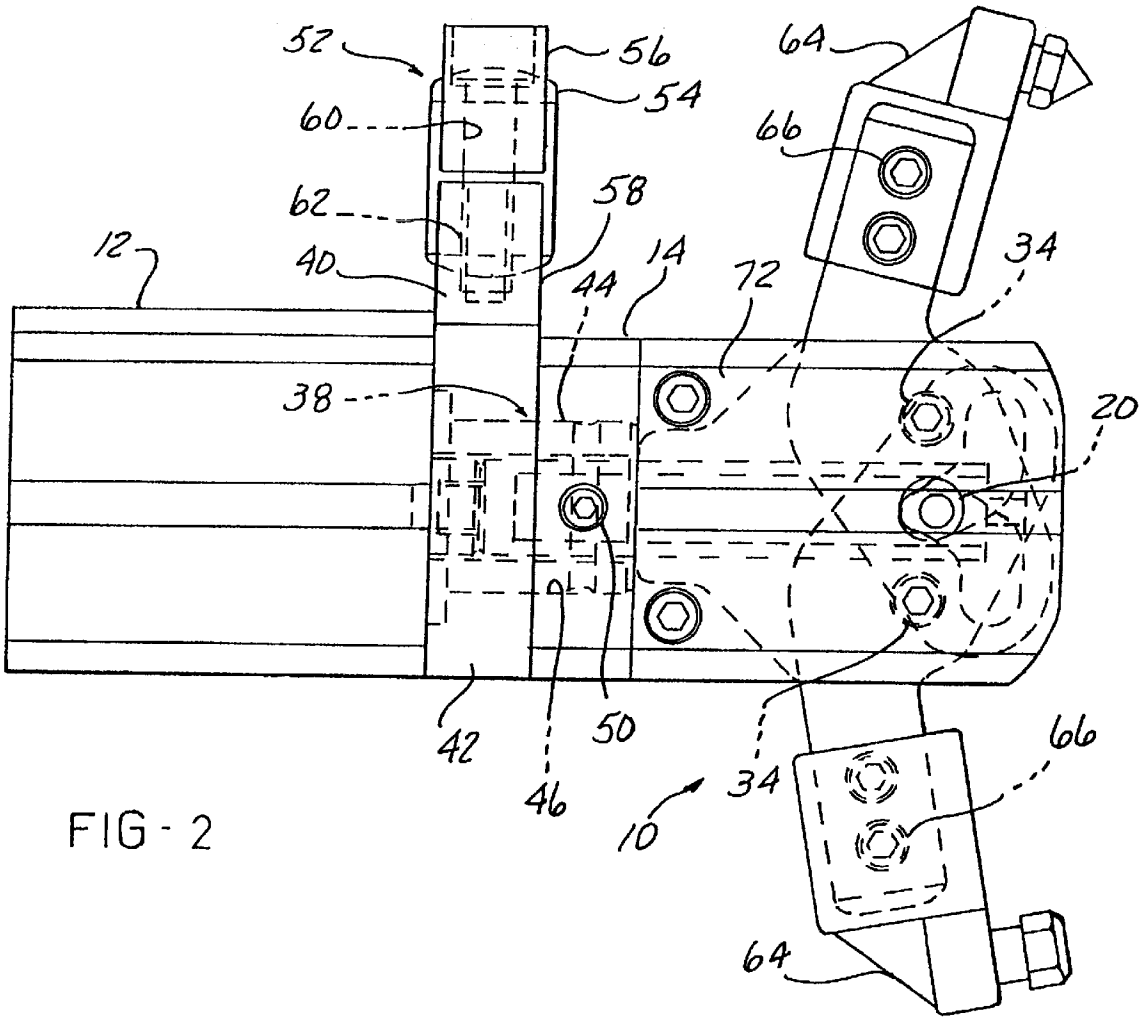
FIG. 2 is a side view of the clamping apparatus in a released position according to the present invention.
Figure 4:
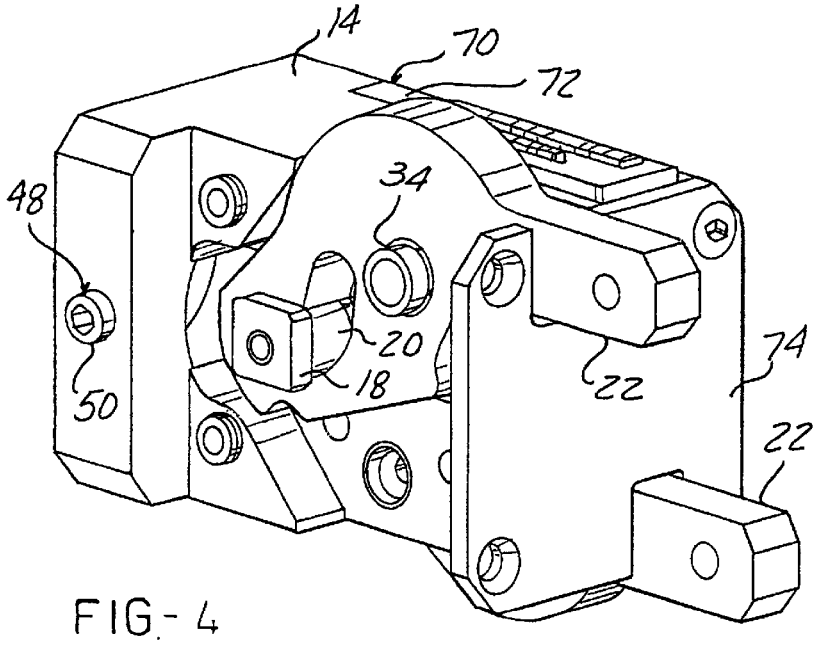
FIG. 4 is a perspective view of an internal cam action clamp according to the present invention with one side plate removed for illustrative purposes.
Figure 9:
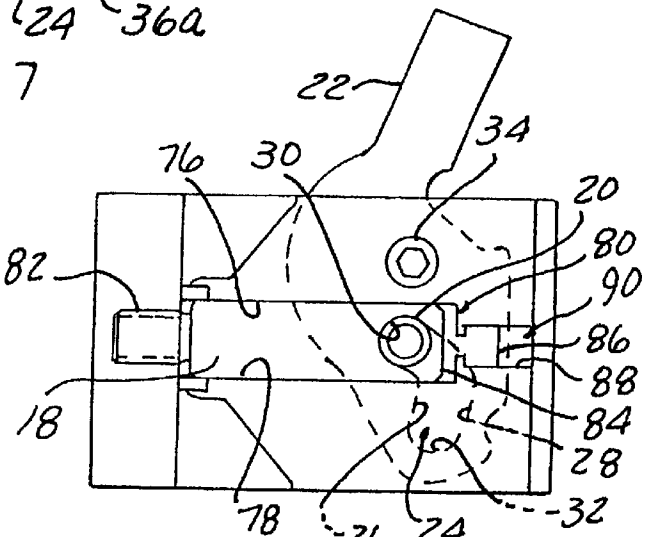

A clamping apparatus 10 according to the present invention is operably engageable with a linear reciprocal actuator 12 moveable between an extended position illustrated in FIG. 2 and a retracted position illustrated in FIG. 1. A hollow housing 14 has a guide track 16 defined on opposing inner surfaces of the hollow housing 14. A slide block 18, best seen in FIG. 4 and FIG. 9, is operably engageable with the guide track 80. The slide block 18 is capable of being driven, moved, and positioned along the guide track 80 by the actuator 12 between first and second end limits of movement corresponding to the retracted and extended positions respectably of the actuator 12. A cam 20 is connected to or carried by the slide block 18 for movement along the guide track 16. The cam 20 is operably connected to the actuator 12 for movement along the guide track 80 in response to movement of the actuator between the retracted and extended positions. At least one pivoting arm 22 is pivotably mounted for rotation about a pivot axis with respect to the housing 14. The pivot axis of each pivoting arm is disposed adjacent to and spaced from the pivot axis. Each pivoting arm 22 has an elongate slot 24 disposed adjacent to and spaced from the pivot axis. The cam 20 is positioned within the elongate slot 24 of each pivoting arm 22 for converting linear reciprocal movement of the cam 20 into pivoting rotation of each pivoting arm 22. Each pivoting arm 22 is in a clamped position when the slide block 18 or cam 20 is in the first end limit of movement as illustrated in FIG. 1, and each pivoting arm 22 is in a released position when the slide block 18 or cam 20 is in the second end limit as illustrated in FIG. 2.

The elongate slot 24 of each pivoting arm 22 is defined by two arcuate surfaces 26 and 28 extending parallel to one another with two end surfaces 30 and 32 joining the arcuate surfaces 26 and 28 to one another to define a closed loop surface. The arcuate surfaces 26 and 28 define convex arcuate segments with respect to the pivot axis of each pivoting arm 22. As best seen in FIGS. 4 and 6–9, each pivoting arm 22 is connected to the housing through a pivot pin 34 defining the pivot axis. The elongate slot 24 extends convex with respect to the pivot axis of the pivot pin 34 having a first end surface 30 closest to the pivot pin 34 and a second end surface 32 furthest from the pivot pin 34. When the pivoting arm 22 is in the clamped position, the actuator 12 is in the retracted position, and the cam 20 is disposed adjacent to the second end surface 32 for furthest from the pivot pin 34. In response to movement of the actuator 12 from the retracted position to the extended position, the cam 20 moves along the elongate slot 24 to a position adjacent to the first end surface 30 closest to the pivot pin 34 as best seen in FIG. 9. FIG. 9 illustrates the pivoting arm 22 in the fully open or released position.

Figure 7:
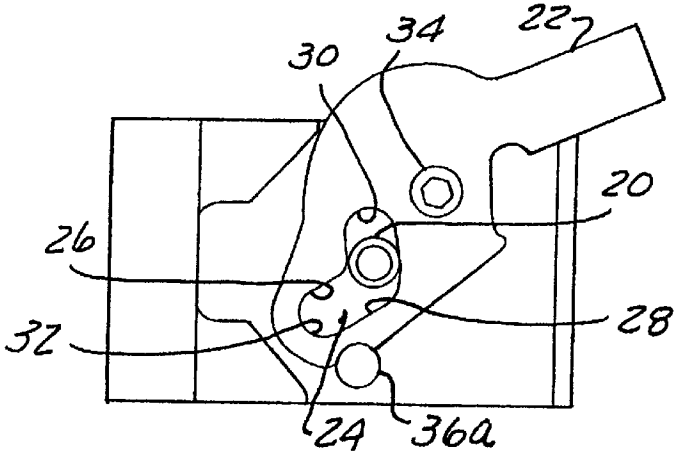
Figure 8:
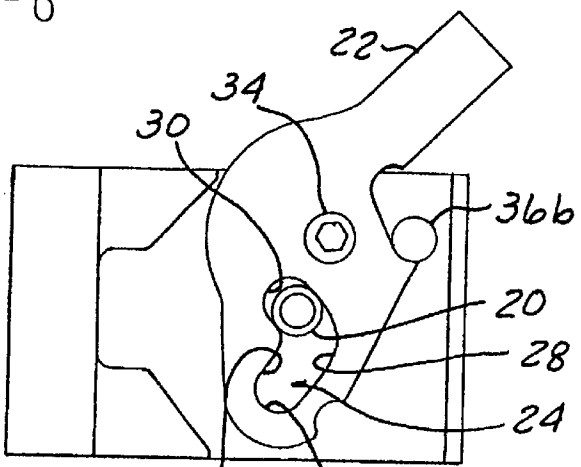

Continuing to refer to FIGS. 6–9, at least one pivot pin 34 is supported from the housing 14 or connection through each pivoting arm 22. Each pivoting arm 22 is pivotal about the pivot axis to define a potential range of arm motion from the clamped position illustrated in FIG. 6 to the fully released position illustrated in FIG. 9. An optional stop projection 86 can be supported from the housing 14 for obstructing or abbreviating the range of arm motion in selective positions to define selectable positions between the clamped position of FIG. 6 and the released position of FIG. 9. By way of illustration, a first stop projection 36a is illustrated in FIG. 7 to restrict further arm motion toward the released position beyond that illustrated. Further movement of the pivoting arm 22 is restricted by engagement of the pivot arm 22 with the first stop projection 36a to provide a released position of approximately 30° open or rotated with respect to the clamped position. Correspondingly, the cam 20 is stopped at a position spaced from the first end surface 30 when using the optional first stop projection 36a as illustrated in FIG. 7. If a greater range of arm motion is required, the optional stop projection 36 can be positioned as illustrated at 36b in FIG. 8. The position of stop projection 36b permits further opening movement of each pivoting arm 22 to a position of approximately 45° with respect to the clamped position. As illustrated in FIG. 8, the cam 20 is permitted to move closer to the first end surface 30 than that permitted in the configuration illustrated in FIG. 7, but is still spaced from the first end surface 30 preventing the full arm motion to the position illustrated in FIG. 9. It should be apparent from this description that if a second pivoting arm 22 is provided, it would appear as an inverted mirror image of that depicted in FIGS. 6 and 9 having a separate pivot pin, elongated slot and optional stop projections. The cam 20 would be extended through both elongate slots on a common axis as best seen in FIGS. 1–3.

Figure 3:
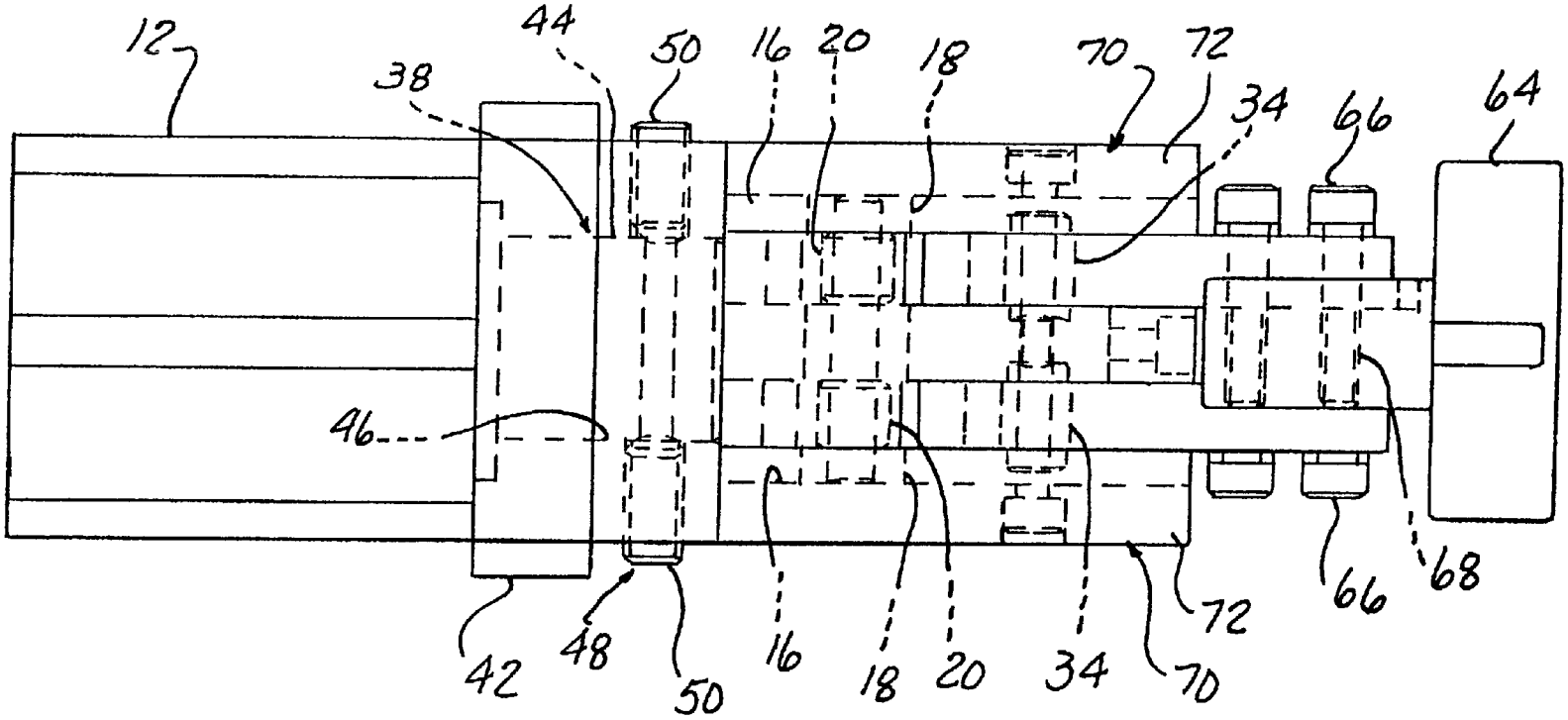
FIG. 3 is a bottom view of the clamping apparatus in a clamped position according to the present invention.

Referring now to FIGS. 1–3, the present invention can include a swivel joint 38 for supporting the housing 14 in any angular orientation with respect to the actuator 12. The swivel joint 38 is connected to or carried by the actuator 12 or mounting bracket 40. The swivel joint 38 includes a plate 42 or portion of the mounting bracket 40 having a collar 44 extending outwardly from the plate 42. The housing 14 includes an aperture 46 complementary in shape to the collar 44 allowing the housing 14 to seat on the collar 44 with the aperture 46 substantially surrounding the collar 44. Fastener means 48 is provided for securing the housing 14 on the collar 44 of the swivel joint 38. The fastener means 48 can include one or more set screws 50 or any other suitable fastener. The swivel joint 38 permits the housing to be seated and secured with respect to the collar 44 in any desired angular orientation with respect to a longitudinal axis of the linear reciprocal actuator 12. The mounting bracket 40 can include means 52 for supporting the clamping apparatus 10 with respect to a support structure. The supporting means 52 can be mounted on the plate 42 or form a portion of the mounting bracket 40. By way of example and not limitation, the supporting means 52 can include a ball or semi-spherical collar 54 engageable with, carried by or connected to the support structure (not shown). The outer periphery of the ball or semi-spherical collar 54 is adjustably engaged between two portions of a split ring 56 and 58 respectively. The two portions of the split ring 56 and 58 are lockingly engageable with respect to the spherical surface of the ball or semi-spherical collar 54 when driven toward engagement with one another by a suitable fastener, such as bolt 60 engaging within threaded aperture 62.

As best seen in FIGS. 1–3, any suitable configuration of fingers 64 can be connected to the outer end of each pivoting arm 22 to provide the desired gripper jaw or end treatment. The selected set of complementary fingers 64 can be connected to the outer ends of each pivoting arm 22 by any appropriate fasteners, such as by way of example and not limitation, bolts 66 threadably engaged within threaded apertures 68.

Referring now to FIG. 4, means 70 is provided for encasing the elongate slot 24 of each pivoting arm 22 and cam 20. The encasing means 70 can include a side plate or cover 72 for substantially enclosing the pivoting arm 22 with respect to the housing 14. In FIG. 4, the side plate or cover 72 is connected to the far side of the housing 14 while the side plate or cover 72 on the near side of the housing 14 has been removed to show the internal structure of the pivoting arm 22, cam 20 and the outer portion of slide block 18. The side plate 72 can be reconnected to the housing 14 by any suitable means, such as threaded fasteners connecting to the inner portion of the housing 14 or through the end plate 74 into the side plate 72. The encasing means 70 attaches to the housing 14 and serves to protect the elongate slot and cam from contamination or foreign matter that can be present in industrial production environments.

Figure 5:
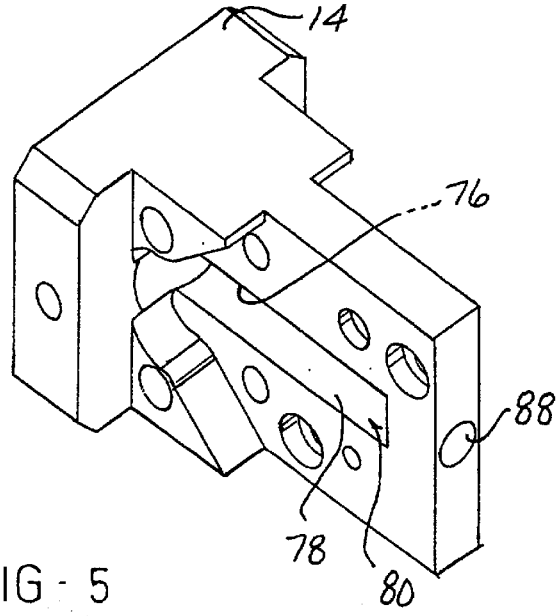
FIG. 5 is a perspective view of a portion of the clamp housing with both side plates and the internal cam mechanism removed for purposes of illustration.
Figure 6:
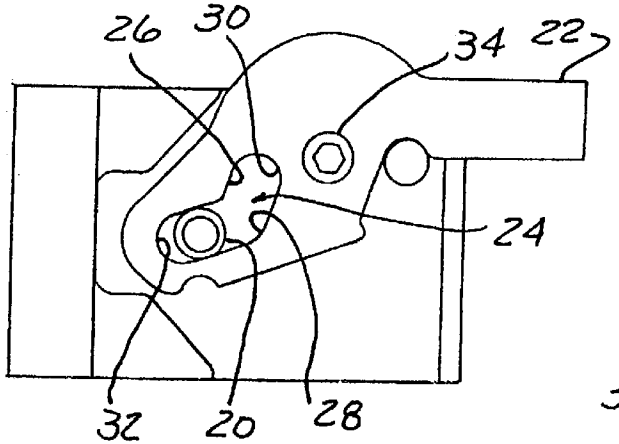
FIGS. 6–9 are schematic, side views of one clamp arm according to the present invention illustrating the interaction of the internal cam-action elements and incorporating optional motion-limiting stop members mounted in various alternative positions.

Referring now to FIG. 5, the inner portion of the hollow housing 14 is depicted with the end plate, both side plates, both pivoting arms, cam and slide block assembly being removed for clarity. The internal portion of the housing 14 includes first and second opposing surfaces 76 and 78 defining a longitudinally extending slot 80 within the hollow housing 14. The longitudinally extending slot 80 operably receives the inner portion of slide block 18 best seen in FIG. 9. The cam 20 extends outwardly from the inner portion of the slide block 18 to the outer portion of the slide block 18, which is supported by slot 80 located in each side plate 72, after passing through the elongate slot 24 of the pivoting arm 22 as best seen in FIG. 4. The inner portion of the slide block 18 includes an adapter 82, best seen in FIG. 9, for receiving the outer end of a rod extending from the linear reciprocal actuator 12 seen in FIGS. 1–3. The inner portion of the slide block 18 also includes a stop-engaging surface 84. An adjustable stop 86 is threadably engaged through the aperture 88 formed in the inner portion of the housing 14 best seen in FIGS. 5 and 9. The adjustable stop member 86 can be threadably adjusted with respect to the hollow interior of the housing 14 for abbreviating a permissible range of motion for the cam 20 along the guide track 80. The guide track 80 defines the permissible range of motion for the slide block 18 and cam 20. The abbreviating means 90, such as adjustable stop member 86, can partially limit the range of arm motion by adjusting the stop member 86 to further encroach on the end portion of the guide track 80 thereby preventing the slide block 18 from reaching the fully extended position of the actuator 12.

Figure 10:
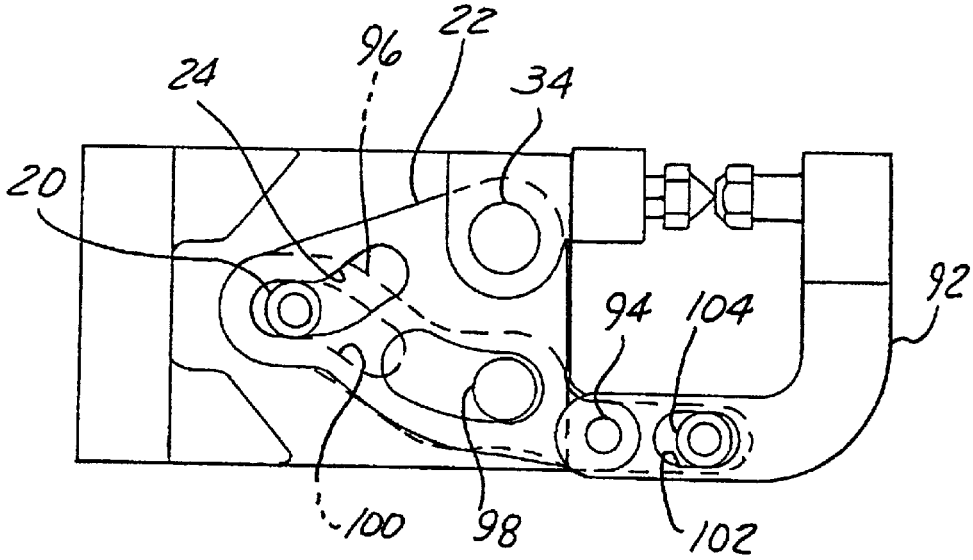
FIG. 10 is a schematic, side view of the clamping apparatus having a single clamp arm in a clamped position and a lost notion link according to the present invention; and, FIG. 11 is a schematic, side view of the clamping apparatus having a single clamping arm in a released position with the lost-motion link according to the present invention.
Figure 11:
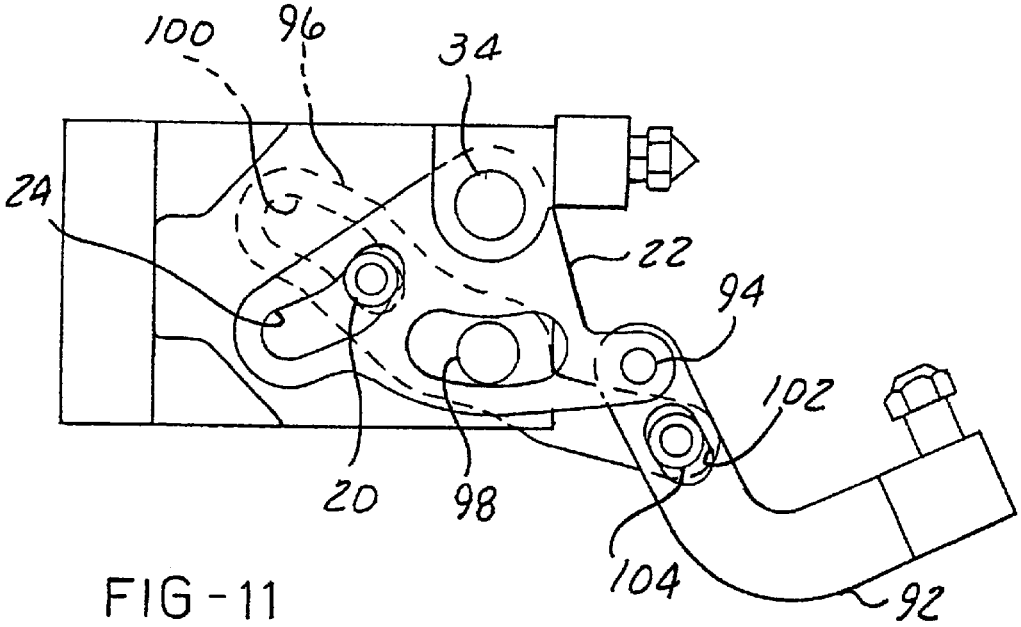

Referring now to FIGS. 10 and 11, a clamping apparatus 10 according to the present invention can also include a second arm portion 92 hingedly connected to the pivoting arm 22 with pivot pin 94. A lost-motion link 96 is pivotally mounted with respect to the housing 14 for rotational movement about pin 98. The lost-motion link 96 also includes an elongate slot 100 for operably receiving a portion of the cam 20 carried by the slide block 18. The second arm portion 92 includes a linear slot 102. A second cam 104 is connected to or carried by the lost-motion link 96 adjacent an end opposite from the elongate slot 100. The second cam 104 operably engages within the linear slot 102 of the second arm portion 92 for moving the second arm portion 92 in response to movement of the cam 20 within the first elongate slot 24 of the pivoting arm 22 and the second elongate slot 100 of the lost-motion link 96. The lost-motion link 96 is rotatably attached to the housing 14. The lost-motion link has a curved slot 100 for receiving the cam 20 to move the pivoting second arm portion 92 of the pivoting arm 22 between the clamped position and the released position as the cam 20 is moved within the elongate slot 24 and the curved slot 100 in response to movement of the slide block 18 along the guide track 80. The cam 20 is positioned within the first and second elongate slots 24 and 100 for converting linear reciprocal movement of the cam into pivoting rotation of the pivoting arm 22 and second arm portion 92. The second arm portion 92 of the pivoting arm 22 is in the clamped position, illustrated in FIG. 10, when the cam 20 and slide block 18 are in the first end limit of movement or retracted position of the linear reciprocal actuator. The second arm portion 92 of the pivoting arm 22 is in a released position, illustrated in FIG. 11, when the slide block 18 and cam 20 are in the second end limit of movement corresponding to the extended position of the linear reciprocal actuator.

While the invention has been described in connection with what is presently considered to be the most practical and preferred embodiment, it is to be understood that the invention is not to be limited to the disclosed embodiments but, on the contrary, is intended to cover various modifications and equivalent arrangements included within the spirit and scope of the appended claims, which scope is to be accorded the broadest interpretation so as to encompass all such modifications and equivalent structures as is permitted under the law.

What is claimed is:

[1. In a clamping apparatus operably engageable with a linear reciprocal actuator moveable between an extended position and a retracted position, said clamping apparatus comprising:

a hollow housing having a guide track defined on opposing inner surfaces;

a slide block operably engageable with said guide track capable of being driven, moved, and positioned along said guide track by said actuator between first and second end limits of movement corresponding to said retracted and extended positions respectively of said actuator;

a cam connected to said slide block for movement therewith; and at least one pivoting arm, each said pivoting arm pivotally mounted for rotation about a pivot axis with respect to said housing adjacent to said guide track, and each said pivoting arm having an elongate slot adjacent to and spaced from said pivot axis, said cam positioned within said elongate slot of each said pivoting arm for converting linear reciprocal movement of said cam into pivoting rotation of each said pivoting arm, such that each said pivoting arm is in a clamped position when said slide block is in said first end limit of movement and each said pivoting arm is in a released position when said slide block is in said second end limit of movement.]

[2. The clamping apparatus of claim 1, wherein said elongate slot of each said pivoting arm is defined by two arcuate surfaces extending parallel to one another with two end surfaces joining said arcuate surfaces to one another to define a closed loop, said arcuate surfaces defined by convex arcuate segments with respect to said pivot axis.]

[3. The clamping apparatus of claim 1, further comprising:

at least one pivot pin supported from said housing for connection through each said pivoting arm, each said pivoting arm pivotal about said pivot axis defining a range of arm motion; and a stop projection supportable by said housing for obstructing said range of arm motion in selective positions to defined selectable positions between said clamped position and said released position.]

4. [The] *In a* clamping apparatus [of claim 1 further] *operably engageable with a linear reciprocal actuator moveable between an extended position and a retracted position, said clamping apparatus* comprising:

*a hollow housing having a guide track defined on opposing inner surfaces;*

*a slide block operably engageable with said guide track capable of being driven, moved, and positioned along said guide track by said actuator between first and second end limits of movement corresponding to said retracted and extended positions respectively of said actuator;*

*a cam connected to said slide block for movement therewith; and*

*at least one pivoting arm, each said pivoting arm pivotally mounted for rotation about a pivot axis with respect to said housing adjacent to said guide track, and each said pivoting arm having an elongate slot adjacent to and spaced from said pivot axis, said cam positioned within said elongate slot of each said pivoting arm for converting linear reciprocal movement of said cam into pivoting rotation of each said pivoting arm, such that each said pivoting arm is in a clamped position when said slide block is in said first end limit of movement and each said pivoting arm is in a released position when said slide block is in said second end limit of movement; and* a swivel joint for supporting said housing in any angular orientation with respect to said actuator, said swivel joint having a plate, a collar mounted on said plate, said housing having an aperture complementary in shape to said collar such that said housing seats on said collar with said aperture substantially surrounding said collar, means for securing said housing on said collar of said swivel joint, said collar permitting said housing to be seated and secured with respect to said collar in any desired angular orientation with respect to a longitudinal axis of said actuator.

5. The clamping apparatus of claim 4, further comprising:

means for supporting said swivel joint with respect to a support structure, said supporting means mounted on said plate of said swivel joint.

[6. The clamping apparatus of claim 1, further comprising:

means for abbreviating a permissible range of motion for said cam along said guide track, wherein said guide track defines said permissible range of motion for said slide block and cam, said abbreviating means incorporated in said housing, each said pivoting arm pivoting about said pivot axis and thereby defining a range of arm motion, said range of arm motion partially limited by said abbreviating means.]

7. [The] *In a* clamping apparatus [of claim 1, further] *operably engageable with a linear reciprocal actuator moveable between an extended position and a retracted position, said clamping apparatus* comprising:

*a hollow housing having a guide track defined on opposing inner surfaces;*

*a slide block operably engageable with said guide track capable of being driven, moved, and positioned along said guide track by said actuator between first and second end limits of movement corresponding to said retracted and extended positions respectively of said actuator;*

*a cam connected to said slide block for movement therewith; and*

*at least one pivoting arm, each said pivoting arm pivotally mounted for rotation about a pivot axis with respect to said housing adjacent to said guide track, and each said pivoting arm having an elongate slot adjacent to and spaced from said pivot axis, said cam positioned within said elongate slot of each said pivoting arm for converting linear reciprocal movement of said cam into pivoting rotation of each said pivoting arm, such that each said pivoting arm is in a clamped position when said slide block is in said first end limit of movement and each said pivoting arm is in a released position when said slide block is in said second end limit of movement; and* means for encasing said elongate slot of each said pivoting arm and said cam, said encasing means attached to said housing and serving to protect said elongate slot and said cam from contamination.

8. [The] *In a* clamping apparatus [of claim 1, further] *operably engageable with a linear reciprocal actuator moveable between an extended position and a retracted position, said clamping apparatus* comprising:

*a hollow housing having a guide track defined on opposing inner surfaces;*

*a slide block operably engageable with said guide track capable of being driven, moved, and positioned along said guide track by said actuator between first and second end limits of movement corresponding to said retracted and extended positions respectively of said actuator;*

*a cam connected to said slide block for movement therewith; and*

*at least one pivoting arm, each said pivoting arm pivotally mounted for rotation about a pivot axis with respect to said housing adjacent to said guide track, and each said pivoting arm having an elongate slot adjacent to and spaced from said pivot axis, said cam positioned within said elongate slot of each said pivoting arm for converting linear reciprocal movement of said cam into pivoting rotation of each said pivoting arm, such that each said pivoting arm is in a clamped position when said slide block is in said first end limit of movement and each said pivoting arm is in a released position when said slide block is in said second end limit of movement;* each said pivoting arm having an articulated portion hingedly connected to said pivoting arm opposite said elongate slot; and a lost-motion link pivotally attached to said housing and said articulated portion at spaced locations from one another, said lost-motion link having a curved slot for receiving said cam to move said articulated portion of said pivoting arm between a clamped position and a released position as said cam is simultaneously moved within said elongate slot and said curved slot in response to movement of said slide block along said guide track.

[9. The clamping apparatus of claim 1, wherein said clamped position is defined by said cam positioned within said elongate slot such that said cam is disposed at a maximum distance with respect to said rotational axis.]

[10. A clamping apparatus for a linear reciprocal actuator moveable between a retracted position and an extended position, said clamping apparatus comprising:

a hollow housing having a guide track defined on opposing inner surfaces;

a slide block operably engageable with said guide track capable of being driven, moved, and positioned along said guide track by said actuator between first and second end limits of movement corresponding to said retracted and extended positions respectively of said actuator;

a cam connected to said slide block for movement therewith; and at least one pivoting arm, each said pivoting arm pivotally mounted for rotation about a pivot axis with respect to said housing adjacent to said guide track, and each said pivoting arm having an arcuate slot adjacent to and spaced from said pivot axis, said cam positioned within said arcuate slot of each said pivoting arm to thereby pivot each said pivoting arm between a clamped position when said slide block is in said first end limit of movement corresponding to said retracted position and a released position when said slide block is in said second end limit of movement corresponding to said extended position as said slide block is moved along said guide track and as said cam is simultaneously moved within said arcuate slot of each said pivoting arm.]

[11. A clamping apparatus comprising:

a hollow housing having a guide track defined on opposed inner surfaces of said housing;

an actuator mountable on said housing and moveable between an extended position and a retracted position;

a cam moveable with respect to said guide track and connected to said actuator such that said cam is driven, moved, and positioned along said guide track by said actuator; and at least one pivoting arm, each said pivoting arm mounted for movement about a pivot axis with respect to said housing, said pivot axis adjacent to and spaced from said guide track, and each said pivoting arm having an elongate slot adjacent to and spaced from said pivot axis, said cam positioned within said elongate slot of each said pivoting arm to pivot each said pivoting arm between a clamped position corresponding to said retracted position of said actuator and a released position corresponding to said extended position of said actuator as said cam is moved along said guide track and simultaneously driven against said elongate slot of each said pivoting arm.]

[12. The clamping apparatus of claim 11, wherein said elongate slot of each said pivoting arm is defined by two arcuate surfaces extending parallel to one another with two end surfaces joining said arcuate surfaces to one another to define a closed loop surface, said arcuate surfaces defined by convex arcuate segments with respect to said pivot axis.]

[13. The clamping apparatus of claim 11, further comprising:

at least one pivot pin support from said housing for connection through each said pivoting arm, each said pivoting arm pivotal about said pivot axis defining a range of arm motion; and a stop projection supportable by said housing for obstructing said range of arm motion in selective positions to define selectable positions between said clamped position and said released position.]

[14. The clamping apparatus of claim 11, further comprising:

means for abbreviating a permissible range of motion for said cam along said guide track, wherein said guide track defines said permissible range of motion for said cam, said abbreviating means incorporated in said housing, each said pivoting arm pivoting about said pivot axis and thereby defining a range of arm motion, said range of arm motion partially limited by said abbreviating means.]

15. [The] *A* clamping apparatus [of claim 11, further] comprising:

*a hollow housing having a guide track defined on opposed inner surfaces of said housing;*

*an actuator mountable on said housing and moveable between an extended position and a retracted position;*

*a cam moveable with respect to said guide track and connected to said actuator such that said cam is driven, moved, and positioned along said guide track by said actuator; and*

*at least one pivoting arm, each said pivoting arm mounted for movement about a pivot axis with respect to said housing, said pivot axis adjacent to and spaced from said guide track, and each said pivoting arm having an elongate slot adjacent to and spaced from said pivot axis, said cam positioned within said elongate slot of each said pivoting arm to pivot each said pivoting arm between a clamped position corresponding to said retracted position of said actuator and a released position corresponding to said extended position of said actuator as said cam is moved along said guide track and simultaneously driven against said elongate slot of each said pivoting arm; and* means for encasing said elongate slot of each said pivoting arm and said cam, said encasing means attached to said housing and serving to protect said elongate slot and said cam from contamination.

16. The clamping apparatus of claim [11] *15*, further comprising:

each said pivoting arm having an articulated portion hingedly connected to said pivoting arm opposite said elongate slot; and a lost-motion link pivotally attached to said housing and said articulated portion at spaced locations from one another, said lost-motion link having a curved slot for receiving said cam to move said articulated portion of said pivoting arm between a clamped position and a released position as said cam is simultaneously moved within said elongate slot and said curved slot in response to movement of said cam along said guide track.

[17. The clamping apparatus of claim 11, wherein said clamped position is defined by said cam positioned within said elongate slot such that said cam is disposed at a maximum distance with respect to said rotational axis.]

18. [The] *A* clamping apparatus [of claim 11 wherein said at least one pivoting arm comprises] *comprising*:

*a hollow housing having a guide track defined on opposed inner surfaces of said housing;*

*an actuator mountable on said housing and movable between an extended position and a retracted position;*

*a cam moveable with respect to said guide track and connected to said actuator such that said cam is driven, moved, and positioned along said guide track by said actuator; and*

*at least one pivoting arm, each said pivoting arm mounted for movement about a pivot axis with respect to said housing, said pivot axis adjacent to and spaced from said guide track, and each said pivoting arm having an elongate slot adjacent to and spaced from said pivot axis, said cam positioned within said elongate slot of each said pivoting arm to pivot each said pivoting arm between a clamped position corresponding to said retracted position of said actuator and a released position corresponding to said extended position of said actuator as said cam is moved along said guide track and simultaneously driven against said elongate slot of each said pivoting arm; and*

*wherein said at least one pivoting arm comprises* first and second pivoting arms having first and second pivot axes respectively on opposite sides of said guide track, each pivoting arm having said elongate slot disposed between said pivot axis and said actuator, such that said first and second pivoting arms are simultaneously moveable between a clamped position corresponding to said retracted position of said actuator and a released position corresponding to said extended position of said actuator.

19. A clamping apparatus comprising:

a hollow housing having a guide track defined on opposed inner surfaces of said housing;

an actuator mountable on said housing;

a cam moveable with respect to said guide track and connected to said actuator such that said cam is driven, moved, and positioned along said guide track by said actuator;

at least one pivoting arm, each said pivoting arm mounted for movement about a pivot axis with respect to said housing, said pivot axis adjacent to and spaced from said guide track, and each said pivoting arm having an elongate slot adjacent to and spaced from said pivot axis, said cam positioned within said elongate slot of each said pivoting arm to pivot each said pivoting arm between a clamped position and a released position as said cam is moved along said guide track and simultaneously driven against said elongate slot of each said pivoting arm; and a swivel joint for supporting said housing in any angular orientation with respect to said actuator, said swivel joint having a plate, a collar mounted on said plate, said housing having an aperture complementary in shape to said collar such that said housing seats on said collar with said aperture substantially surrounding said collar, means for securing said housing on said collar of said swivel joint, said collar permitting said housing to be seated and secured with respect to said collar in any desired angular orientation with respect to a longitudinal axis of said actuator.

20. The clamping apparatus of claim 19, further comprising:

means for supporting said swivel joint with respect to a support structure, said supporting means mounted on said plate of said swivel joint.

*21. A clamping apparatus comprising:*

*a fluid linear reciprocal actuator having a piston rod moveable between an extended position and a retracted position along a path of travel;*

*a single cam operably associated with the piston rod for movement; and*

*at least one arm mounted for rotation about a pivot axis and having an elongate slot, the single cam positionable within the elongate slot of said at least one arm for converting linear reciprocal movement of the piston rod into rotation of said at least one arm, such that said at least one arm is in a clamped position when the cam is in the retracted position and said at least one arm is in a released position when the cam is in the extended position.*

*22. The clamping apparatus of claim 21 wherein said at least one arm further comprises:*

*a first arm rotatable in a first plane; and*

*a second arm rotatable in a second plane, the first and second planes substantially parallel to one another.*

*23. The clamping apparatus of claim 21 further comprising:*

*a member having at least one slot for operably receiving and guiding the single cam along the path of travel.*

*24. The clamping apparatus of claim 23 wherein the member further comprises:*

*a central portion having the at least one slot formed therein; and*

*said at least one arm including first and second arms pivotally connected to the central portion.*

*25. The clamping apparatus of claim 23 wherein the member further comprises:*

*at least one side plate mounted adjacent said central portion.*

*26. The clamping apparatus of claim 21 further comprising:*

*a cam support connectible to the actuator; and*

*said at least one arm including first and second arms with the cam support interposed therebetween.*

*27. The clamping apparatus of claim 21 wherein said elongate slot of said at least one arm is defined by two arcuate surfaces defined by convex arcuate segments with respect to said pivot axis.*

*28. The clamping apparatus of claim 27 wherein said elongate slot of each said pivoting arm is defined by two end surfaces joining said arcuate surfaces to one another to define a closed loop surface.*

*29. The clamping apparatus of claim 21 further comprising:*

*a body having a recess for receiving the at least one arm.*

*30. The clamping apparatus of claim 29 wherein the body further comprises:*

*at least one cam aperture for receiving the single cam.*

*31. The clamping apparatus of claim 30 further comprising:*

*at least one side plate connectible to the body for at least partially enclosing the at least one cam aperture.*

*32. A clamping apparatus comprising:*

*a fluid linear reciprocal actuator having a piston rod moveable between an extended position and a retracted position along a path of travel;*

*a single cam coupled to said piston rod and having two ends, the cam extending perpendicular with respect to the path of travel; and*

*at least one arm mounted for rotation about a pivot axis and having an arcuate slot defined by convex arcuate segments with respect to said pivot axis, one end positionable in the arcuate slot of said at least one arm for pivoting said at least one arm between a clamped position, wherein said cam is in the retracted position, and a released position, wherein said cam is in the extended position.*

*33. The clamping apparatus of claim 32 further comprising:*

*means for at least partially enclosing at least one end of the single cam.*

*34. The clamping apparatus of claim 33 wherein enclosing means further comprises:*

*a body associated with the actuator and having at least one slot for receiving the single cam; and*

*at least one side plate associated with the body positionable adjacent the at least one slot.*

*35. The clamping apparatus of claim 32 further comprising:*

*a member having at least one slot for operably receiving and guiding the single cam along the path of travel.*

*36. The clamping apparatus of claim 35 wherein the member further comprises:*

*a central portion having the at least one slot formed therein; and*

*said at least one arm including first and second arms pivotally connected to the central portion.*

*37. The clamping apparatus of claim 35 wherein the member further comprises:*

*at least one side plate having the at least one slot with the at least one arm disposed between the at least one side plate and the path of travel.*

*38. The clamping apparatus of claim 32 further comprising:*

*a cam support connectible to the actuator; and*

*said at least one arm including first and second arms with the cam support interposed therebetween.*

*39. The clamping apparatus of claim 32 further comprising:*

*a body having a recess for receiving the at least one arm.*

*40. The clamping apparatus of claim 39 wherein the body further comprises:*

*at least one cam aperture for operably receiving and guiding the single cam along the path of travel.*

*41. The clamping apparatus of claim 40 further comprising:*

*at least one side plate connectible to the body for at least partially enclosing the at least one cam aperture.*

*42. The clamping apparatus of claim 39 further comprising:*

*the at least one pivoting arm pivotally mountable with respect to the body.*

* * * * *

UNITED STATES PATENT AND TRADEMARK OFFICE

CERTIFICATE OF CORRECTION

PATENT NO. : RE 39,786 E
APPLICATION NO. : 10/154368
DATED : August 21, 2007
INVENTOR(S) : Jeffery Dellach It is certified that error appears in the above-identified patent and that said Letters Patent is hereby corrected as shown below:

On the title page (56), insert --886,003 4/1908 Kraft--.

On the title page (56), insert --3,618,931 A 11/1971 Blatt--.

On the title page under (75) delete "Jeffrey" and insert therefor --Jeffery--.

On column 4, line 9 delete "or" and insert therefor --for--.

On column 11, line 5 delete "movable" and insert therefor --moveable--.

Signed and Sealed this

Twenty-fifth Day of December, 2007

JON W. DUDAS
*Director of the United States Patent and Trademark Office*

US00RE39786C1

(12) EX PARTE REEXAMINATION CERTIFICATE (10807th)

United States Patent
Dellach

(10) Number: US RE39,786 C1
(45) Certificate Issued: Feb. 3, 2016

(54) CLAMP WITH IMPROVED INTERNAL CAM ACTION

(71) Applicant: Jeffery J. Dellach, Macomb, MI (US)

(72) Inventor: Jeffery J. Dellach, Macomb, MI (US)

(73) Assignee: NORGREN AUTOMATION SOLUTIONS, LLC, Saline, MI (US)

Reexamination Request:
No. 90/013,430, Jan. 23, 2015

Reexamination Certificate for:

| | |
|---|---|
| Patent No.: | **Re. 39,786** |
| Issued: | **Aug. 21, 2007** |
| Appl. No.: | **10/154,368** |
| Filed: | **May 23, 2002** |

Certificate of Correction issued Dec. 25, 2007

Related U.S. Patent Documents

Reissue of:

| | |
|---|---|
| (64) Patent No.: | **6,079,896** |
| Issued: | **Jun. 27, 2000** |
| Appl. No.: | **09/003,927** |
| Filed: | **Jan. 7, 1998** |

(51) Int. Cl.

| | |
|---|---|
| ***F16B 2/18*** | (2006.01) |
| ***B25B 5/08*** | (2006.01) |
| ***B25B 5/16*** | (2006.01) |

(52) U.S. Cl.
CPC ..... *B25B 5/087* (2013.01); *B25B 5/163* (2013.01)

(58) Field of Classification Search
None
See application file for complete search history.

(56) References Cited

To view the complete listing of prior art documents cited during the proceeding for Reexamination Control Number 90/013,430, please refer to the USPTO's public Patent Application Information Retrieval (PAIR) system under the Display References tab.

*Primary Examiner* — Jeffrey L Gellner

(57) ABSTRACT

A clamping apparatus, for use with an actuator, has a housing with a guide track mounted on or formed in the housing. A roller or cam operably engages with the guide track such that the cam can be moved and positioned along the guide track by way of the actuator. At least one pivoting arm is pivotally mounted on the housing adjacent to and spaced from the guide track. Each pivoting arm has an elongate slot adjacent to the shoulder. The elongate slot has two arcuate surfaces positioned parallel to each other and has two end surfaces joining the arcuate surfaces to define a closed loop surface. The cam is positioned within the elongate slot of each pivoting arm to pivot each pivoting arm between a clamped position and a released position as the cam is moved along the guide track and driven against the arcuate surfaces of each pivoting arm. The clamping apparatus can include stop members for limiting the movement of the cam and/or the range of motion for each pivoting arm, a swivel mount and/or a mounting bracket enabling the clamping apparatus to be positioned in any desired angular orientation, a lost-motion link incorporated in the internal cam action of the clamping apparatus, and/or side plates for preventing the infiltration of foreign matter in the internal cam action.

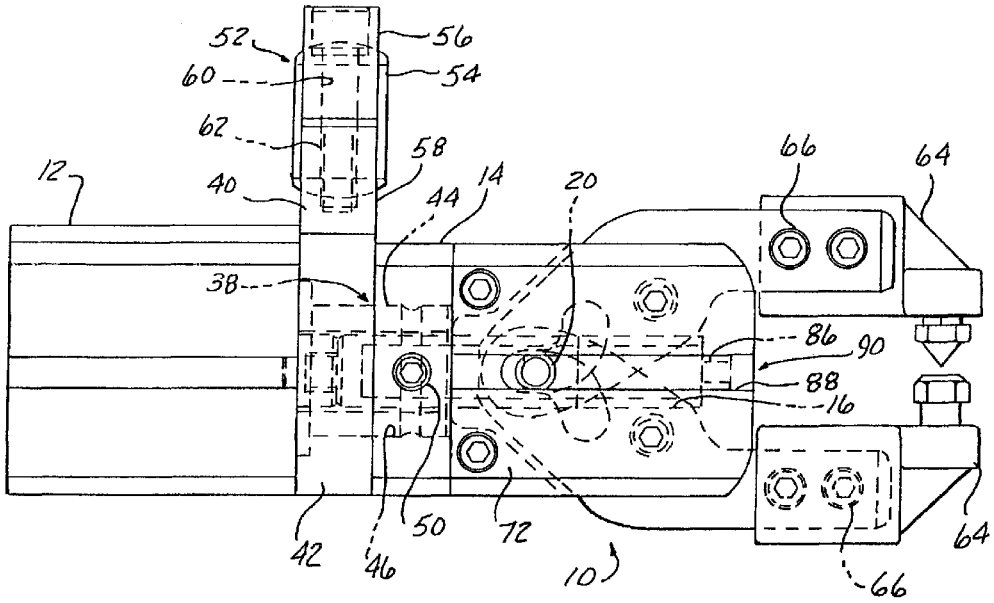

EX PARTE REEXAMINATION CERTIFICATE

NO AMENDMENTS HAVE BEEN MADE TO THE PATENT

AS A RESULT OF REEXAMINATION, IT HAS BEEN DETERMINED THAT:

The patentability of claims 4, 5, 7, 8, 15, 16 and 18-42 is confirmed.

Claims 1-3, 6, 9-14 and 17 were not reexamined.

* * * * *